(12) United States Patent
Lampart (10) Patent No.: US 10,536,831 B2
(45) Date of Patent: Jan. 14, 2020

(54) METHOD FOR CONTROLLING A WIRELESS COMMUNICATION UNIT

(71) Applicant: GEMALTO M2M GMBH, Munich (DE)

(72) Inventor: Thomas Lampart, Berlin (DE)

(73) Assignee: GEMALTO M2M GMBH, Munich (DE)

(*) Notice: Subject to any disclaimer, the term of this patent is extended or adjusted under 35 U.S.C. 154(b) by 162 days.

(21) Appl. No.: 15/520,728

(22) PCT Filed: Oct. 7, 2015

(86) PCT No.: PCT/EP2015/073102
§ 371 (c)(1),
(2) Date: Apr. 20, 2017

(87) PCT Pub. No.: WO2016/062539
PCT Pub. Date: Apr. 28, 2016

(65) Prior Publication Data
US 2017/0318409 A1  Nov. 2, 2017

(30) Foreign Application Priority Data

Oct. 22, 2014 (EP) .................................. 14189924

(51) Int. Cl.
*H04W 4/60* (2018.01)
*H04W 4/70* (2018.01)
(Continued)

(52) U.S. Cl.
CPC ............... *H04W 4/60* (2018.02); *G06F 9/46* (2013.01); *H04W 4/70* (2018.02); *H04W 88/02* (2013.01)

(58) Field of Classification Search
None
See application file for complete search history.

(56) References Cited

U.S. PATENT DOCUMENTS

| 2014/0018055 A1* | 1/2014 | Majewski | ............... H04W 4/50 455/418 |
| 2014/0369296 A1 | 12/2014 | Breuer et al. | |
| 2016/0066253 A1* | 3/2016 | Kollu | ............... H04M 11/066 370/328 |

FOREIGN PATENT DOCUMENTS

| EP | 2 685 747 A1 | 1/2014 |
| WO | WO 2013/113925 A1 | 8/2013 |

OTHER PUBLICATIONS

International Search Report (PCT/ISA/210) dated Nov. 5, 2015, by the European Patent Office as the International Searching Authority for International Application No. PCT/EP2015/073102.

(Continued)

*Primary Examiner* — Sisley N Kim
(74) *Attorney, Agent, or Firm* — Buchanan Ingersoll & Rooney PC (57) ABSTRACT

In a method for downloading subscription information to an identification unit connected to a wireless communication device operating within a cellular network, which includes at least one packet gateway node and a remote provisioning server being connected to it, the wireless communication device operates in a mode with limited access to the remote provisioning server. The method includes submitting a request comprising an authentication identifier and access information relating to one remote provisioning server from the identification unit on an assigned communication channel to the cellular network, forwarding at the cellular network said request using a connection tunnel preconfigured according to said access information from the packet gateway node to the remote provisioning server addressed by said access information, and providing a response message comprising data relative to subscription information through said preconfigured connection tunnel to the identification unit, when subscription information is detected.

15 Claims, 5 Drawing Sheets

(51) Int. Cl.
*G06F 9/46* (2006.01)
*H04W 88/02* (2009.01)

(56) References Cited

OTHER PUBLICATIONS

Written Opinion (PCT/ISA/237) dated Nov. 5, 2015, by the European Patent Office as the International Searching Authority for International Application No. PCT/EP2015/073102.
Draft ETSI TS 102 511 V.0.0.11 (Jul. 2007); Human Factors (HF); AT Commands for Assistive Mobile Device Interfaces; pp. 1-72.

* cited by examiner

METHOD FOR CONTROLLING A WIRELESS COMMUNICATION UNIT

FIELD OF THE INVENTION

The present invention relates to a method for controlling a wireless communication unit. The invention also pertains to a wireless communication unit using said method.

BACKGROUND OF THE INVENTION

Generally, in the field of wireless communication it is known that wireless communication applications comprise at least a wireless communication unit and an application control unit. Such wireless communication applications are in particular mobile handsets, tracking & tracing devices, car entertainment units, metering devices or similar devices.

The application control unit and the wireless communication unit according to the prior art are communicating via a command interface which allows sending of instructions from the application control unit to the wireless communication unit. The command interface is preferably an AT-interface, a quasi-standard for controlling modems which is implementing the Hayes command set. In particular such wireless communication units are built by so-called machine-to-machine (M2M) modules, which are units comprising practically all necessary components for enabling the wireless communication application to conduct wireless communication.

In recent developments said wireless communication units are more and more equipped with an internal operating platform accessible for the manufacturers of wireless communication applications. This operating platform allows controlling the wireless communication unit by software entities executed on that internal operating platform inside the wireless communication unit. This is advantageous as it reliefs the wireless communication application from tasks running on its own application control unit, by using the processor resources on-board of the wireless communication unit. This saves processor resources on the application control unit and allows easier maintenance of the control software.

Main disadvantage of this development is that for the application manufacturer it is cumbersome to allow controlling the software entities running on the internal operating platform from the application control unit. In particular advanced implementations might require interaction with the application control unit, which is by now not foreseen. This results effectively in a decision for the application manufacturer, if the wireless communication unit is controlled by the application control unit or by a software unit running on the internal operating platform.

Further disadvantageous is that by now there is no possibility to modify the command set of the command interface of the wireless communication unit, be it by adding new commands and/or changing the behavior of existing commands, in particular completely removing the functionality of a command.

It is therefore the goal of present invention to overcome the mentioned disadvantages and to propose a solution for an improved control of the wireless communication unit.

Further alternative and advantageous solutions would, accordingly, be desirable in the art.

SUMMARY OF THE INVENTION

For this it is according to a first aspect of the invention suggested a method to operate a wireless communication unit according to claim 1. It is further suggested according to a second aspect of the invention a wireless communication unit according to claim 10.

According to a first aspect of the invention it is proposed a method for controlling a wireless communication unit comprising
 a registration unit and
 a main control unit comprising a command interface, a command interpreter, the command interpreter being configured to process commands received by means of the command interface and to execute wireless communication tasks with a wireless network,
the main control unit being configured to receive commands by means of the command interface,
the wireless communication unit further comprising at least one secondary control unit, configured to execute commands,
the method comprising the steps of, for the registration unit:
 receiving from the secondary control unit a registration request for registration of a command,
 storing representation relative to the command corresponding to the received registration request,
further comprising the step for the main control unit (4), upon reception of a command by means of the command interface,
 checking received command with registration unit,
 in case a representation relative to received command being stored in registration unit, forwarding received command to secondary control unit.

According to the inventive method the wireless communication unit is connected to an application control unit which is configured to send controlling commands to the wireless communication unit. The invention enables the wireless communication unit to forward incoming commands from the application control unit to the internal operating platform, in particular secondary control units operating in the internal operating platform, once they register for such a command.

For that a registration unit is part of the wireless communication unit. In another preferred embodiment the registration unit is part of the main control unit.

This registration unit receives registration requests from the secondary control unit, and stores the registration relationship between the secondary control unit and a depicted command in a memory unit, in particular permanent memory. Upon request, in particular from the command interface, the registration unit informs the requester if for a given command a registration is present.

This mechanism is advantageous as it allows easy configuration, even when placing the wireless communication application in the field.

Preferably the secondary control unit submits its registration requests to the registration unit of the wireless communication unit upon installation of the secondary control unit. This assures that the wireless communication unit is up and running after installation for handling all commands where it is dedicated for. If later, during lifetime of the wireless communication unit, a respective command is submitted from the application control unit, the registration assures, that the command is forwarded to the secondary control unit and processed there the way it is foreseen by the device manufacturer or the distributor of the secondary control unit.

In particular for operating the wireless communication unit during its lifetime it is further advantageous to allow the secondary control unit to unregister from a command. Alternatively also a temporary registration, that is for a predefined time resp. for a predefined number of calls, the secondary control unit registers for a certain command.

According to a preferred embodiment it is proposed a method, wherein in response to said forwarding of the command, receiving at the main control unit from said secondary control unit a command response comprising a processing indicator, said processing indicator indicating if the forwarded command is completely processed, executing said command at the command interpreter of the main control unit, if the processing indicator indicates that the command is not completely processed, otherwise returning the command response to the command interface.

This preferred embodiment allows for the secondary control unit to decide if after processing the command the command interpreter of the main control unit processes the command as well, in particular to execute wireless communication tasks with a wireless network. This is in particular helpful for situations where the secondary control unit is supposed to make some preparatory operations or wants to log the received command in terms of a debug mode.

This is achieved by a processing indicator as part of the response message from the secondary control unit to the command interface. Advantageously the response message comprises additional information, in particular when the return code of the operations during processing might indicate an error code.

It is in a preferred embodiment suggested to check in the command interface besides the processing indicator additionally for such error codes. If the processing indicator indicates that the command is not completely processed, and the return code indicates an error code, it is advantageous to return the response message from the secondary control unit to the calling application control unit, instead of forwarding the command to the command interpreter of the main control unit. Nevertheless it is preferable that the secondary control unit only returns an unset processing indicator when the return code does not indicate an error.

Alternatively or additionally it is in another advantageous embodiment suggested a method wherein upon forwarding command to secondary control unit, processing the command at the secondary control unit by sending at least one command to the main control unit by means of the internal interface and receiving response for said sent command from the main control unit.

This is an alternative option for the secondary control unit to have the command interpreter of the main control unit participate in processing the incoming command, in particular with respect to wireless communication tasks.

Unlike the previous option it is here opened up the possibility for the secondary control unit to a) send to the main control unit a command that varies from the received original command and b) to send more than one command to the main control unit.

With this primary functionality it allows implementing in the secondary control unit certain logic for controlling the behavior of the wireless communication unit, in particular the main control unit. This is advantageous for the device manufacturer to control the wireless communication unit even with complicated operations, while in the same time relieving the application control unit from executing such algorithms. Consequently the application control unit does not require powerful and expensive operating resources.

Further advantageous is the proposed method wherein upon reception of the command response from secondary control unit at the main control unit, in case processing indicator of command response indicates that the command is not completely processed, and command interpreter of main control unit indicates that the command is not executable by command interpreter, returning the command response received from secondary control unit to the command interface.

This embodiment allows the implementation of commands that are not defined for the command interpreter of the main control unit. Those commands are dedicated to be sent to the secondary control unit. Simply by sending a registration request for a by now non-existent command the wireless communication unit is put into the position to handle this command by forwarding it to the secondary control unit.

The normal operation is to respond to such commands in the secondary control unit with a processing indicator that indicates that the command is completely processed. Should this not be the case, then an error would occur once the command interpreter gets forwarded an unknown command. Therefore it is proposed that after a command is successfully processed at the secondary control unit, but the command interpreter returns an "unknown-command-error", that instead of the error message the return message from the secondary control unit is returned to the calling application control unit. This embodiment effectively leads to a more robust method.

According to another preferred embodiment it is proposed a method wherein upon forwarding command to secondary control unit, processing the command at the secondary control unit consisting of immediately or after predefined time responding with processing indicator indicating that command is completely processed.

With this embodiment the secondary control unit is put into the position to completely mute a command, that is, it is not processed at all. This is in particular advantageous out of security reasons. So the processing consists of just returning a response, including a processing indicator. To operate a wait-timer during the processing step is also encompassed by this embodiment, in particular a wait-timer implemented by executing operations with no change of status after termination.

Depending upon the type of command it is recommended to send to the application control unit a return code indicating that the command was not processed, resp. that the command is deactivated.

In another advantageous embodiment it is suggested that the command interface comprising an external interface and an internal interface, wherein the main control unit is further configured to communicate with an application control unit communicatively connected to the wireless communication unit by means of the external interface, and to communicate with the secondary control unit by means of the internal interface.

This embodiment handles the application control unit and the at least one secondary control unit individually in that way that for each of the unit a separate interface is available in the command interface.

This is in particular advantageous with respect to another preferred embodiment which proposes a method wherein the wireless communication unit comprises at least two secondary control units.

and wherein the received command at the wireless communication unit is received by means of the internal interface from a first secondary control unit, and after checking received command with registration unit, forwarding received command to a second secondary control unit.

With that embodiment a first secondary control unit which registered for a certain command is able to process commands which are received at the command interface from a second secondary control unit. In effect this allows a communication between different secondary control units. Those secondary control units are either situated in the same internal operating platform or there are more than one internal operating platforms situated in the wireless communication unit, and the first and second secondary control units are situated in different of the internal operating platforms.

The operation of the second secondary control unit does not necessary need to be triggered by a command from the application control unit. Instead there may be a time trigger or an asynchronous event, in particular an URC, which was received at the second secondary control unit, and which urged the second secondary control unit to send a command to the command interface. Due to the fact that the first secondary control unit registered for that command, it gets forwarded the command from the command interface. In effect this allows a kind of inter-process-communication between different secondary control units, in particular midlets running within one or more internal operating platforms of the wireless communication unit.

In another preferred embodiment it is further suggested a method wherein at the secondary control unit upon detection of one of a plurality of events, sending an asynchronous message indicating detected event to main control unit, at the main control unit forwarding said asynchronous message to the command interface.

With this embodiment also the implementation of asynchronous messages, in the context of AT commands known as URCs, is introduced for the secondary control units. The embodiment enables the secondary control unit, asynchronously from any messaging, in particular commands, to send a message to the command interface. The message is comparable to a response message, but without previous request. The command interface of the main control unit is configured to receive such asynchronous message from the command interpreter or other components of the main control unit, and is configured to forward a received asynchronous message to control units connected to the command interface. Depending upon the type of asynchronous message, be it an incoming call or SMS or a simple measurement, the asynchronous message is forwarded to each connected control unit, or only to those that registered for exactly that type of asynchronous message.

According to this embodiment the command interface is further configured to receive such asynchronous messages also from secondary control units, be it triggered through an incoming command or—and more likely—through other triggers as set out above.

As both an application control unit and at least one secondary control unit is connected to the command interface, it is foreseen in this embodiment that the asynchronous messages from the secondary control unit is forwarded to both of the control units. In particular it is foreseen that the asynchronous message from a first secondary control unit is forwarded to a second secondary control unit situated in an internal operating platform of the wireless communication unit.

With this embodiment the secondary control unit is fully enabled to implement an internal interface to the main control unit of the wireless communication unit. In effect this simplifies implementation of the processes of the application control unit. But still the lead remains at the application control unit, in particular when it is equipped with a user interface or other event mechanisms.

According to a second aspect of present invention it is suggested a wireless communication unit comprising a main control unit, the main control unit comprising a command interface, a command interpreter and a registration unit, the command interpreter being configured to process commands received by means of the command interface and to execute wireless communication tasks with a wireless network, the main control unit being configured to receive commands by means of the command interface, the wireless communication unit further comprising an internal operating platform, the internal operating platform comprising at least one secondary control unit, configured to execute commands, the main control unit is configured to:
  receive from the secondary control unit a registration request for registration of a command,
  store representation relative to the command corresponding to the received registration request in the registration unit, upon reception of a command by means of the command interface,
  check received command with registration unit,
  in case a representation relative to received command being stored in registration unit, forward received command to secondary control unit.

The wireless communication unit according to this embodiment shares all advantages of the method according to the first aspect of the invention.

As it is shown this invention advantageously solves the depicted problem and hence seamlessly allows controlling the wireless communication unit both by internal operating platform and application control unit. It further solves the problem of missing possibility to modify the command set of a wireless communication unit.

BRIEF DESCRIPTION OF THE DRAWINGS

The following description and the annexed drawings set forth in detail certain illustrative aspects are indicative of a few of the various ways in which the principles of the embodiments may be employed. Characteristics and advantages of the present invention will appear when reading the following description and annexed drawings of advantageous embodiments given as illustrative but not restrictive examples.

Figure 1:
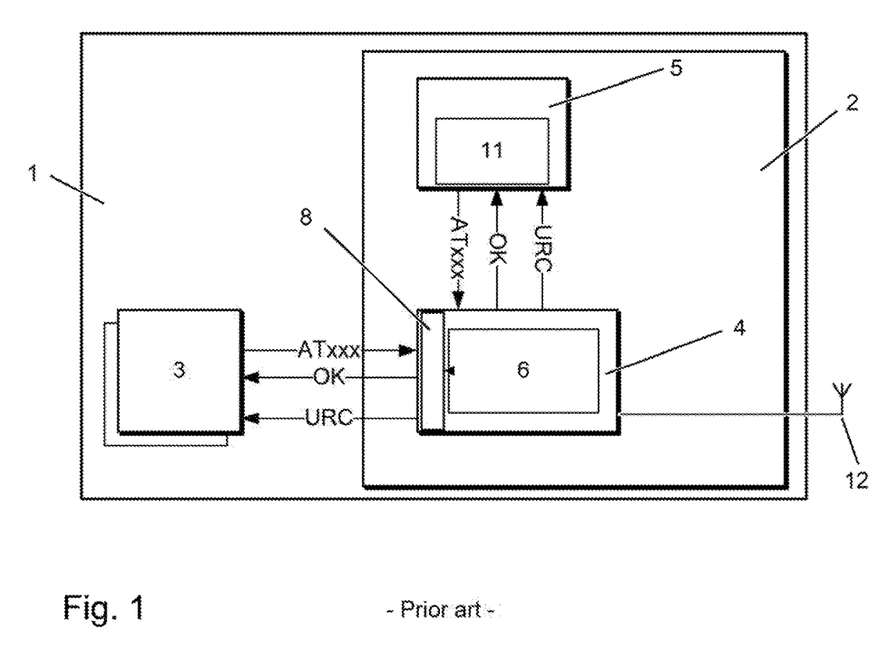
FIG. 1 represents a wireless communication application according to the prior art.

FIG. 1 schematically shows a wireless communication application 1 according to the prior art. It comprises a wireless communication unit 2 and an application control unit 3. The wireless communication application 1 is in particular a device for operating in cellular or non-cellular wireless networks, like 2G, 3G, 4G according to ETSI 3GPP standardization resp. Wifi according to IEEE 802.11, Bluetooth/ZigBee according to IEEE 802.15, or Wimax according to IEEE 802.15. The wireless communication unit 2 is preferably implemented as a wireless module, in particular a machine-to-machine (M2M) module which acts as a modem for the application control unit 3.

The application control unit 3 implements all device logic, e.g. for a personal device like a mobile handset, a PDA, barcode scanner or point-of-sale-device, in particular including a user interface. For doing so the application control unit 3 communicates with the wireless communication unit 2 via a command interface 8. The command interface 8 is in particular an AT command interface for modems implementing the Hayes AT command set.

The wireless communication unit 2 comprises additionally a main control unit 4, and a command interpreter 6. These are dedicated for processing the received commands and conduct all steps necessary to do operations on the air interface with the cellular or non-cellular wireless network via antenna 12. Additionally the wireless communication unit 2 comprises an internal operating platform 5. This is a platform which allows wireless communication application manufacturer—that is: the device manufacturer—to install secondary control units 11 in the wireless communication unit 2. A secondary control unit 11 is in particular a software unit configured to execute control operations for the main control unit 4 of the wireless communication unit 2. In preferred embodiments the internal operating platform 5 is a platform configured with a JAVA virtual machine, and the secondary control unit 11 is a JAVA midlet running in said JAVA virtual machine. The support for other programming environments with virtual machines like C# or script languages like Python, PHP etc. are also encompassed.

The secondary control unit 11 behaves the same way towards the main control unit 4 as the application control unit 3 would do. That means it sends in particular AT commands, receives responses and is configured to receive asynchronous messages, in particular unsolicited result codes (URCs). For the main control unit 4 it is no material difference from which control unit it receives its command. A parallel control for both control units is further possible. What is not directly possible is any kind of synchronization between the application control unit 3 and the secondary control unit 11. For a parallel control a device manufacturer has to strictly define what tasks are done by the application control unit 3 and which are done by the secondary control unit 11, or to provide a dedicated proprietary communication path between the application control unit 3 and the secondary control unit 11, separate from the command interface 8 and the AT command set.

Figure 2A:
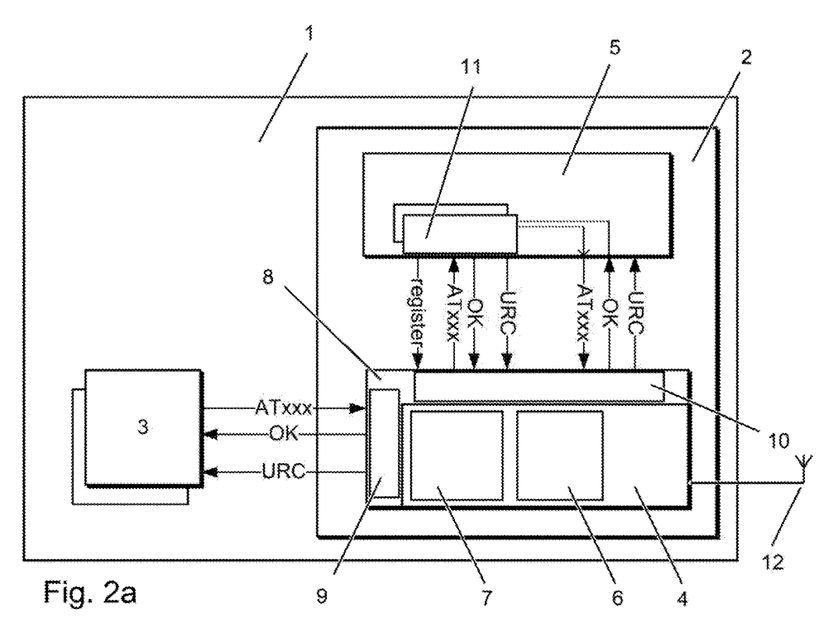
FIG. 2a represents a wireless communication application of the type to which the present invention is applied as an embodiment.

Here comes the invention into play, which is illustrated in the preferred embodiment shown in FIG. 2a. Generally it comprises the same components of a wireless communication application 1, including the wireless communication unit 2 and the application control unit 3. Further the wireless communication unit 2 comprises a main control unit 4, with a command interface 8 and a command interpreter 6, as well as an antenna 12. Further the internal operating platform 5 comprises at least one secondary control unit 11.

The command interface 8 in particular comprises an external interface 9 and an internal interface 10. The external interface 9 is the command interface towards the application control unit 3. Commands, in particular AT commands, submitted from the application control unit 3 generally arrive at the external interface and are handled by the command interface 8.

The internal interface 10 is the command interface towards the secondary control unit 11. It is in particular foreseen that there are more than one secondary control units 11, in particular by installing different JAVA midlets. This is in particular foreseen that way, that there are either one internal operating platform 5 comprising more than one JAVA midlet, or alternatively more than one internal operating platform 5, in particular comprising one secondary control unit 11. The latter is advantageous if various operating languages like JAVA and a script language are to be supported.

The main control unit 4 further comprises the registration unit 7. This registration unit 7 is configured to store registration requests received from the secondary control unit 11 for certain commands to be received at the command interface 8. When a registration request for a command is received through the internal interface 10, it is checked if it is correct, in particular allowable. If so, the command is added to the registration unit 7 and stored as a registration record indicating the command and the secondary control unit in memory means accessible for the registration unit 7, preferably in a permanent memory like in the flash file system of the wireless communication unit 2.

If after the registration operation the application control unit 3 submits a command to the external interface 9, it is first checked against the registration unit 7, if for this command a registration record of a secondary control unit 11 is present. If no registration for that command is available for the registration unit 7, the command is forwarded to the command interpreter 6 of the main control unit 4. The command interpreter 6 is configured to process this command, in particular in conjunction with further components of the main control unit 4, like those who control the communication over the air interface. The results of the processed command, in particular a result code, is returned to the calling application control unit 3.

If a registration for this command is available for the registration unit 7, then the command is forwarded to the secondary control unit 11, which previously registered for this command. If two or more secondary control units registered for the command, there are the options to either serve in the succession of registration or to define a priority system on the secondary control units. This priority could comply with a JAVA midlet permission system, so that one secondary control unit has higher rights than the other, and is to serve first.

The secondary control unit 11 which got forwarded the command has different options how to process the command. In particular it is configured to handle the command alone, e.g. for setting up new functionalities. In a preferred embodiment the secondary control unit 11 thus processes the command in form of a logger, in particular in conjunction with a permanent memory accessible for the internal operation platform. Alternatively the secondary control unit 11 has the capability to send commands to the command interpreter 6 of the main control unit 4 via the internal interface 10. In response the secondary control unit 11 receives and handles the command results from the main control unit 4.

The secondary control unit 11 responds via the internal interface 10 of the main control unit 4 to the forwarded command by way of a response message. This response message in particular comprises a processing indicator. The processing indicator is used by the command interface 8 to figure out, if the secondary control unit 11 has fully processed the command or not.

If the processing indicator indicates the command as fully processed, then the received response is forwarded through the external interface 9 to the application control unit, without involvement of the command interpreter 6 of the main control unit 4.

If the processing indicator indicates the command as not fully processed, then the original command is forwarded to the command interpreter 6 of the main control unit 4 and processed there. This is in particular advantageous when communication tasks with the wireless network are to be carried out.

The processing indicator is in particular implemented by a special return code. In the field of AT commands all messaging is text string based. In that sense a response message comprising an "OK" is in particular understood as a fully processed command. If the response message is empty or comprises something else than "OK", then the command is not fully processed and is to be processed by the command interpreter 6.

Further the secondary control unit 11 according to preferred embodiment is configured to handle asynchronous events, in particular unsolicited result codes (URC) as part of the AT command interface. The handling has in particular two different characteristics. In a first characteristic the secondary control unit 11 is configured to receive URCs. In that sense it behaves like an application control unit 3, but connected via the internal interface 10. Some URCs are typically automatically forwarded from the main control unit 4 to all control units connected to the command interface 8. This includes also the secondary control unit 11. For some URCs a control unit has to register for, and only those registered control units receive the URCs when they occur.

As a second characteristics the secondary control unit 11 is configured to launch URCs. When a special event occurs, an URC defined for such events is submitted to the internal interface 10. The command interface 8 handles the received URC and in particular forwards it to all other control units connected to the command interface 8, in particular the application control unit 3. Also for URCs from a secondary control unit 11 it is foreseen that they are either mandatory or require a registration from the control unit, in particular an application control unit 3.

Thus in an advantageous way a communication between the secondary control unit 11 and the application control unit 3 is possible, in particular the application control unit 3 is configured to react on such status messages and e.g. display them on a screen of the application control unit 3.

Figure 2B:
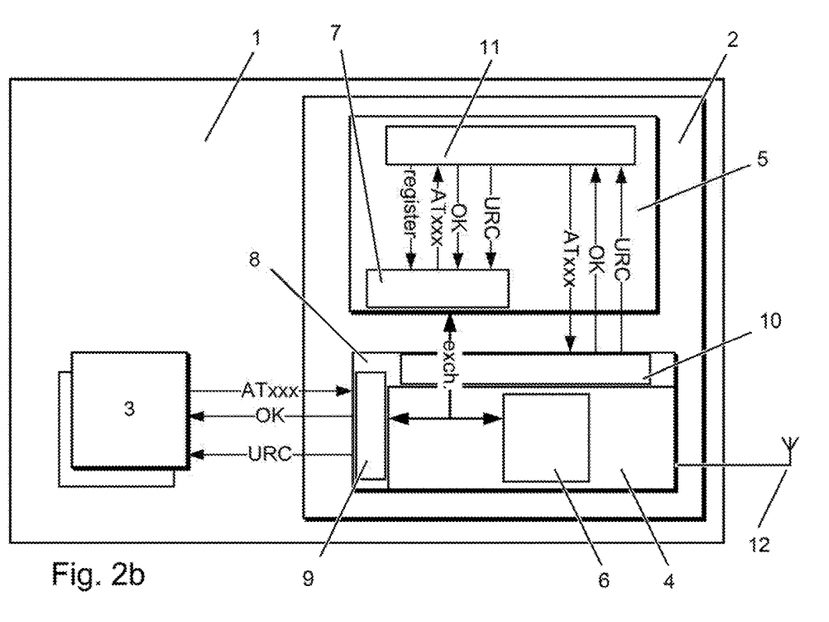
FIG. 2b represents another wireless communication application of the type to which the present invention is applied as an embodiment.

FIG. 2*b* shows another preferred embodiment of the invention. It shows basically the same components of a wireless communication application 1 according to the one shown in FIG. 2*a*. The major difference is that the registration unit 7 is not part of the main control unit 4 anymore, but it is embedded in the internal operating platform. This is advantageous as the registration unit 7 may be implemented as a JAVA midlet, alike the secondary control unit 11. Hence the communication between secondary control unit and registration unit preferably uses JAVA communication techniques applicable to midlets running in one JAVA virtual machine.

The main control unit 4 is in this embodiment configured to exchange incoming AT commands directly, preferably unconditionally, to the registration unit 7 running in the internal operating platform 5. When the registration unit figures out that the command is not handled within the secondary control unit 11, it is via the exchange link back to the command interpreter 6 comprised in the main control unit. Otherwise it is handled in the secondary control unit the way it is described for the previous embodiment.

Figure 3:
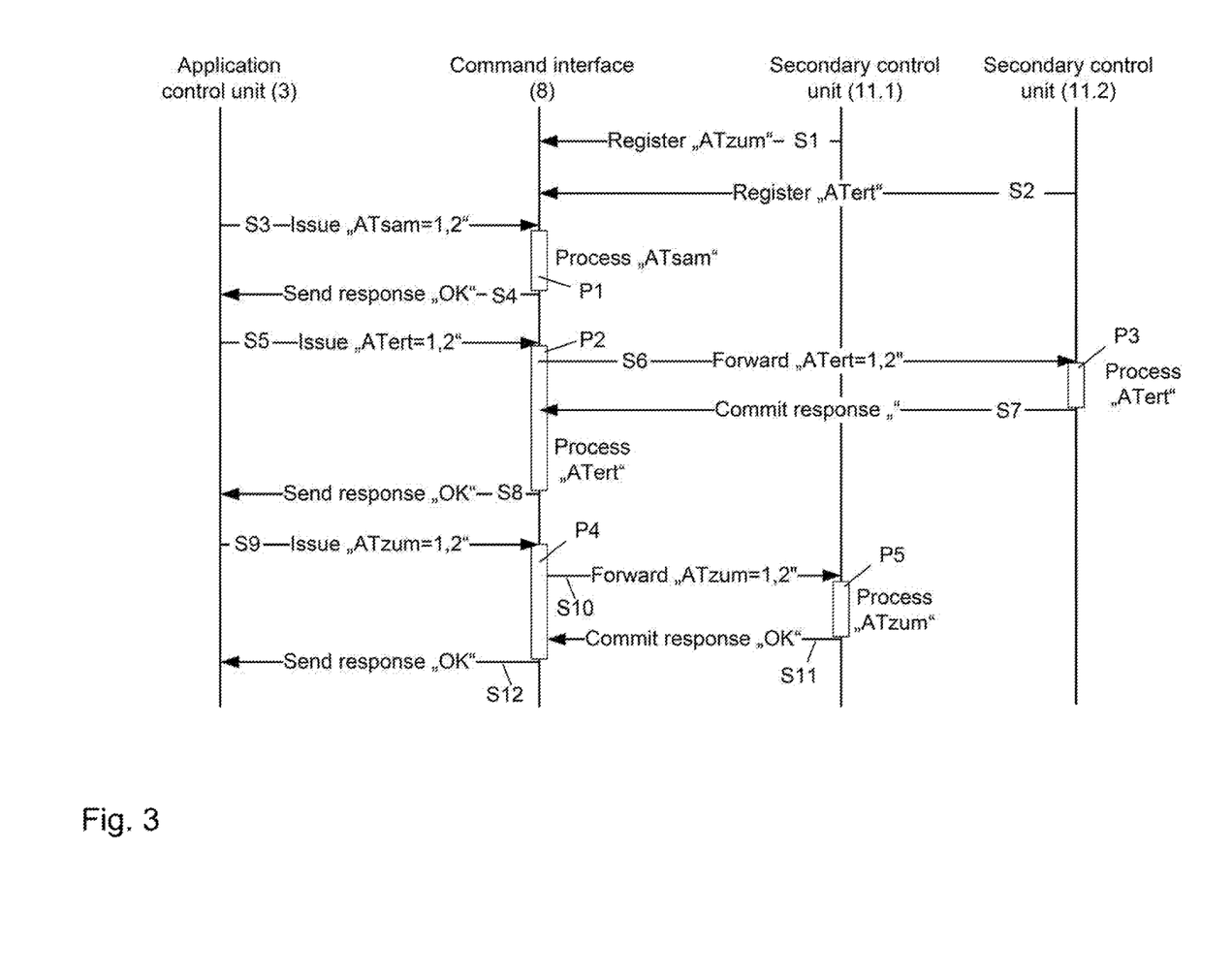
FIG. 3 shows a sequence diagram indicating a message flow according to an embodiment of the inventive method.

FIG. 3 illustrates an exemplary embodiment of the inventive method with a message flow between some of the introduced components. Shown are as messaging start- and endpoints the application control unit 3, the command interface 8 of the main control unit 4 and two secondary control units 11.1 and 11.2. For the illustration of the process it makes no difference if the two secondary control units 11.1, 11.2 are situated in the same internal operating platform 5 or in separate ones. It makes in particular no difference if the secondary control units 11.1, 11.2 are implemented in the same programming language or not.

The process starts with registration requests S1, S2 from the secondary control units 11.1, 11.2. Secondary control unit 11.1 sends a registration request comprising AT command "ATzum" to the command interface 8. The command interface 8 forwards this request to the registration unit 7 (not shown) and stores the registration for command "ATzum" for secondary control unit 11.1.

The same happens for secondary control unit 11.2, which registers itself for AT command "ATert" in the registration unit 7.

The registration requests are in this preferred embodiment permanently stored, and therefore survive a power down of the whole wireless communication application 1.

In a later step the application control unit 3 issues as request message S3 command "ATsam=1,2" to the command interface 8. At the command interface 8 it is first checked if the received command is contained in the registration unit 7. For that it is only the basic command body checked, wherein the parameter "1,2" are ignored. Therefore it is checked if for the received command a registration request is stored by the registration unit 7.

This is for command "ATsam" not the case. Hence, this command is in processing step P1 independently processed in the main control unit 4 and with response message S4 the result of the command processing is returned to the application control unit 3. This is the normal behavior for all nonregistered commands.

In the next step the application control unit 3 issues the request message S5 including the command "ATert=1,2". The registration check reveals that for this command a registration from secondary control unit 11.2 is available.

Hence, the processing step P2 first comprises to forward the received command with message S6 to secondary control unit 11.2, which is registered for this command. Here at secondary control unit 11.2 the command is processed with processing step P3.

After processing has concluded, the result is sent back with response message S7 to the command interface. In this case the response comprises an empty processing indicator. This shows that the command was not fully processed at the secondary control unit 11.2. Therefore the command interpreter of the main control unit is supposed to continue processing of the command within processing step P2. The result of that processing is then sent back in message S8 to the calling application control unit 3.

When the application control unit sends another AT command "ATzum=1,2" with message S9 to the command interface 8, it is figured out that secondary control unit 11.1 registered for processing this command. As part of processing step P4 it is therefore forwarded with message S10 to the secondary control unit 11.1. There the command is fully processed in processing step P5. The result of the processing is returned in response message S11 to the command interface. In the response message now the processing indicator is set, here indicated by the "OK" as part of the response message. Other information may be further included in the response message.

The setting of the processing indicator shows, that the command is fully processed and therefore the response message S11 is in message S12 forwarded to the calling application control unit 3, without any involvement of main control unit 4.

In a preferred embodiment such a process flow is applicable to the situation of a wireless communication application 1 who wants to launch regularly certain communication like sending an SMS or starting an IP connection in order to e.g. submit measuring results of an attached sensor. To assure that the costs for such a regular submission do not exceed a defined level, it is to avoid that this communication is started, when the wireless communication unit is in a roaming situation. In particular in areas near (cellular network) borders it can accidentally happen that the wireless communication application 1 is in roaming mode without being noticed, even for a human operator. When now the regular sending operation is about to be launched by receiving an appropriate AT command from the application control unit, then the secondary control unit 11.2 first takes the lead. The secondary control unit 11.2 checks in processing step P3, if the wireless communication unit is in roaming mode or in its home network. This is in particular done by sending further AT commands to the main control unit 4. Advantageously the application control unit 3 is relieved from such accompanying checks, which can certainly comprise much more complicated decisions and general operating logic.

If the wireless communication unit 2 is not in roaming mode, the processing indicator shows, that the processing was not fully finished, and the normal processing of the original command is upon reception of return message S7 carded out by the main control unit 4. That means the sending of the measurement via SMS or IP connection to a remote server is conducted.

If the wireless communication unit 2 is in roaming mode, the processing indicator in the response message (alike S11) shows that the command is fully processed, and so the expensive execution of the command is to be prevented. It is in particular advantageous to inform the calling application control unit 3 with accompanying information in response message S12, which is forwarded to the application control unit, about the situation that the sending was not done. Further steps to mitigate the situation can then be done by the application control unit 3. In the secondary control unit 11.2 it is preferably even tried to set up a connection to the home network by way of a reselection. If that process were successful, then in a kind of self-healing approach the sending through the main control unit could even be carried out, which is simply launched by returning a message from the secondary control unit 11.2 with a not set processing indicator.

Figure 4:
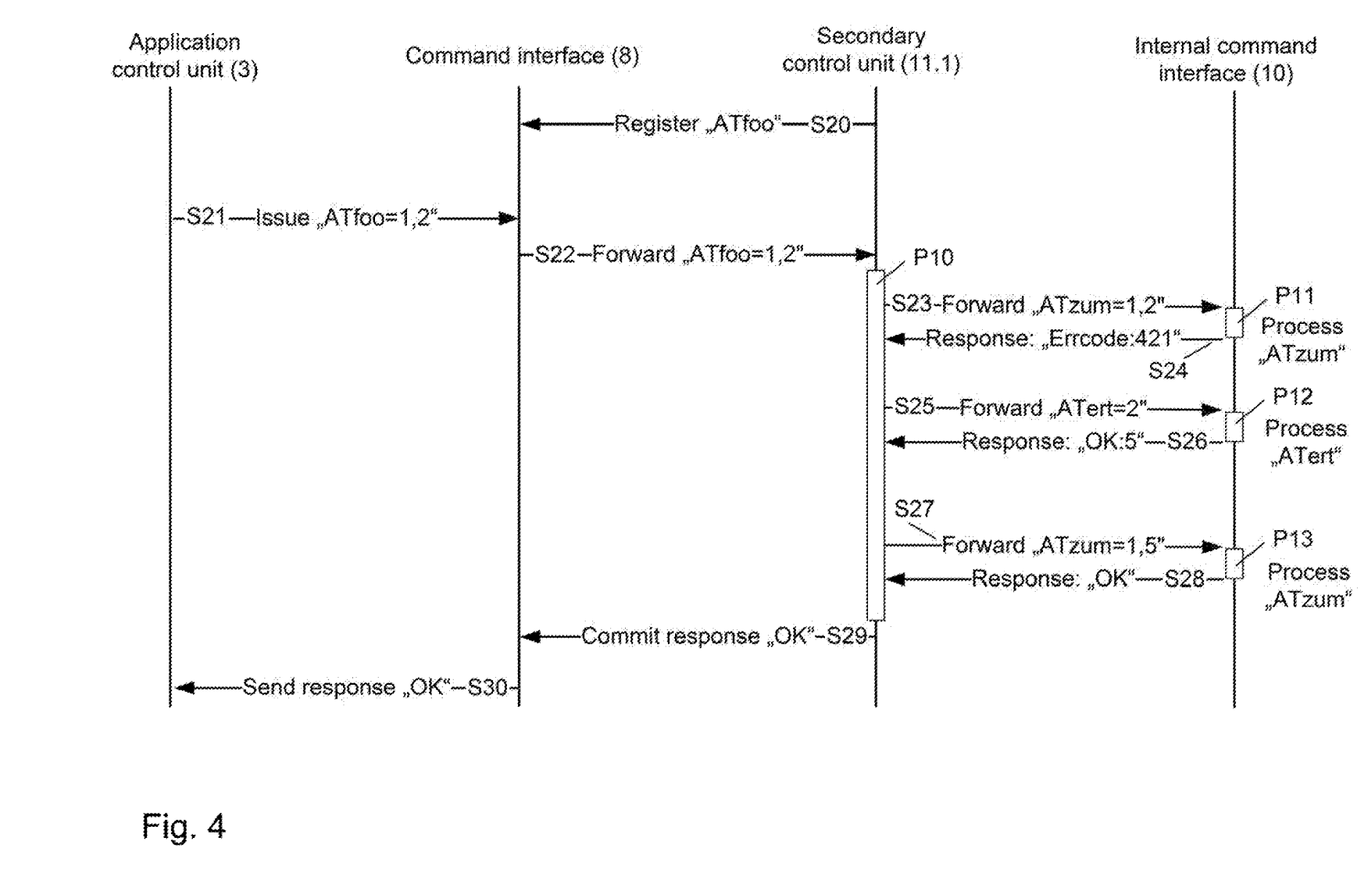
FIG. 4 shows a sequence diagram indicating a message flow according to another embodiment of the inventive method.

Another use case for the inventive method is shown in an embodiment shown in FIG. 4. It starts again with a registration message S20 from the secondary control unit 11.1 to the command interface 8 for AT command "ATfoo". As stated above, this informs the command interface about a registration of the secondary control unit 11.1 on a certain command.

Application control unit 3 later issues with message S21 the command "ATfoo=1,2". After checking the registration unit 7 it turns out that secondary control unit 11.1 has registered for this command. Thus the command is forwarded from the command interface to secondary control unit 11.1 with message S22. The command is processed at the secondary control unit 11.1 with processing step P10.

As part of processing step P10 the secondary control unit 11.1 launches a couple of requests S23, S25, S27 to the internal command interface 10 of the main control unit 4, in particular in order to be processed by the command interpreter 6 and further components of the main control unit 4. The shown message flow shows a first message S23 with AT command "ATzum=1,2", which results after processing at the command interpreter processing step P11 in an error code 421 within message S24. The secondary control unit 11.1 now has error handling means and sends in message S25 a command "ATert=2" to the internal command interface 10. This is a requesting message, the processing P12 of it consists from returning as result message S26 a certain value, here 5. With this value now the command "ATzum=1, 5" is launched in message S27 and operated in process step P13. With this parameter the processing step P13 terminates successful which is indicated in return message S28.

After optional further steps within processing step P10 the secondary control unit 11.1 returns a commit response S29 to the command interface 8. The command interface 8 detects the processing indicator, indicating a full processed command, and thus the received response is directly forwarded to the application control unit 3.

As part of the message flow for processing step P10, it is also foreseen that another secondary control unit 11.2 has registered for one of the commands sent to the internal command interface 10, S23, S25, S27. In this case at the internal command interface 10 the same check is done as shown before, in particular in process step P2 on FIG. 3, in response to command "ATert", and thus secondary control unit 11.2 gets involved. It is both possible, that the value 5 of response message S26 is originated in secondary control unit 11.2 or in the command interpreter 6. This is due to that command interpreter 6 continues to process command "ATert", when the response from secondary control unit 11.2 does not indicate in the processing indicator, that the command was completely processed, as is shown in FIG. 3.

For the exemplary message shown in FIG. 4, it is in particular encompassed by this embodiment of the invention that the command interpreter 6 of the main control unit 4 cannot interpret command "ATfoo", as it is not part of the supported AT command set of the wireless communication unit.

By registration of the secondary control unit 11.1 for exactly this command it is practically introduced a new command. In the described embodiment "ATfoo" forms an aggregate command for a set of commands which require some more logic and details, but the application control unit is relieved from this tasks.

Examples for such newly introduced operations are in particular set up of call forwarding or call barring in conjunction with a cellular wireless network. For those operations some logic needs to be implemented, in particular in response to network responses, in particular if the feature is supported by the wireless network or not. By checking if a call forwarding is already setup and needed to be removed first, the requested operation is carried out through an implementation in the secondary control unit 11.1. For the application control unit 3 thus a new command e.g. "ATfwc=MSISDN,1" for setting up a call forwarding is preferably implemented, and e.g. "ATfwc=MSISDN,0" for switching if off. It is up to the implementation of the secondary control unit 11.1, by using the mechanisms suggested in present invention.

Figure 5:
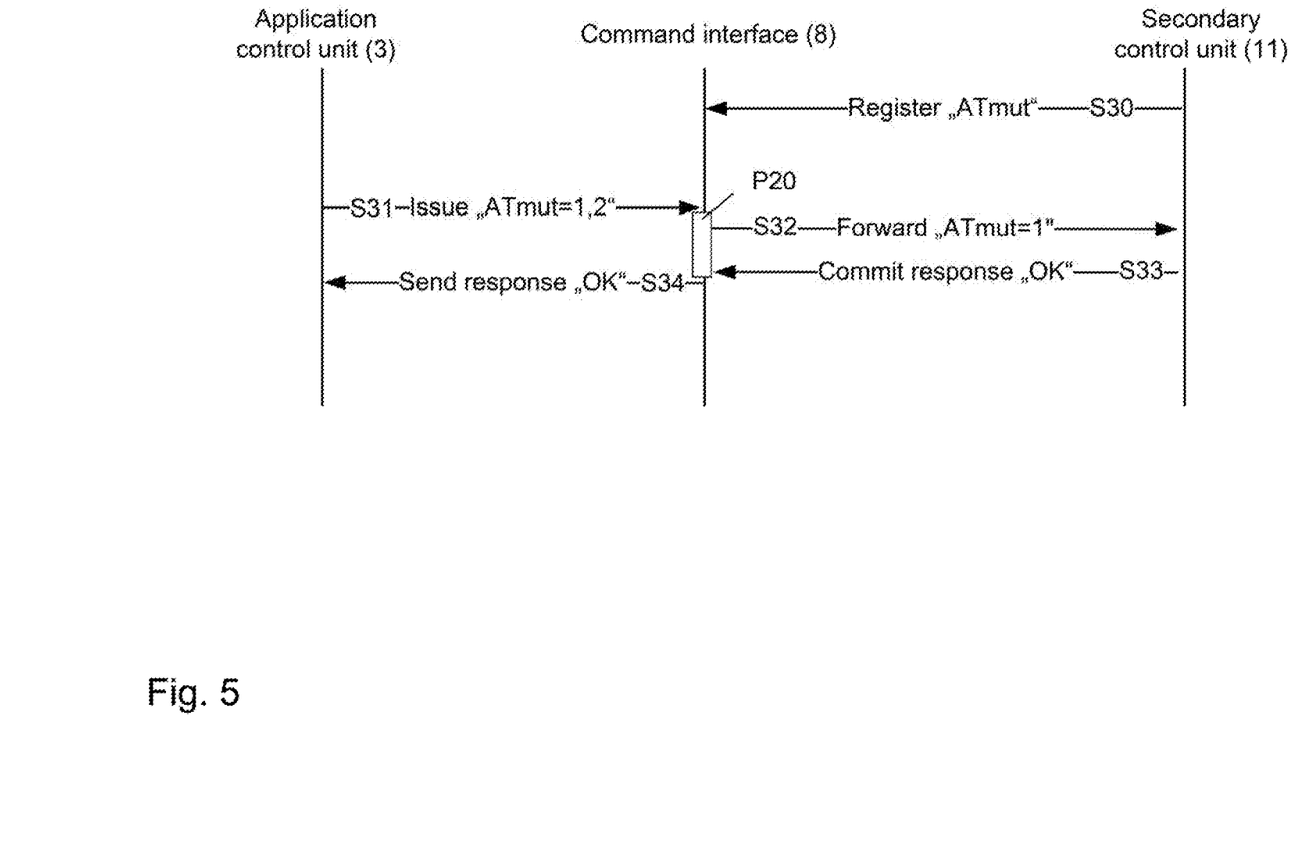
FIG. 5 shows another sequence diagram indicating a message flow according to another embodiment of the inventive method.

Another exemplifying way of using the proposed invention is shown in FIG. 5. Here secondary control unit 11 registers with message S30 for AT command "A Tmut" at the registration unit 7 via command interface 8.

When after that the application control unit 3 issues with message S31 AT command "ATmut=1,2", it is processed in processing step P20 by forwarding it with message S32 to the secondary control unit 11, that has registered for this command. The processing of this command in the secondary control unit 11 now consists—except an optional wait period—of the return of response message S33. In effect, nothing happens in secondary control unit 11. The response message S33 includes a set processing indicator, indicated by the "OK" in message S33. Hence the command interface 8 directly sends the response back to the calling application control unit 3 with message S34. By that, the command interpreter of the main control unit 4 is fully circumvented. In effect this leads to a muting of the command for the application control unit 3. It is therefore recommend using this option only in those cases where it does not harm the general behavior of the application control unit 3 and the wireless communication application 1 as such. Further it is recommended to inform the calling application control unit 3 about the fact that the command was not successfully processed, in particular by way of a return code indicating that the command is muted.

Apart from that, this is a simple and reliable way of managing the feature set of a wireless communication unit 1 for the application control unit 3, wherein all commands contributing exclusively to suppressed features are added to the registration unit 7. A simple reconfiguration by removing such commands from the registration unit would on the fly allow the activation of a feature of the wireless communication unit 2.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for controlling a wireless communication unit comprising
a registration unit and
a main control unit comprising a command interface, a command interpreter, the command interpreter being configured to process commands received by means of the command interface and to execute wireless communication tasks with a wireless network,
the main control unit being configured to receive commands by means of the command interface,
the wireless communication unit further comprising an internal operating platform, the internal operating platform comprising at least one secondary control unit, configured to execute commands,
the method comprising the steps of, for the registration unit:
receiving from the secondary control unit a registration request for registration of a command,
storing representation relative to the command corresponding to the received registration request,
further comprising the step for the main control unit, upon reception of a command by means of the command interface,
checking received command with registration unit,
in case a representation relative to received command being stored in registration unit, forwarding received command to secondary control unit, wherein in response to said forwarding of the command,
receiving, at the main control unit, from said secondary control unit, a command response comprising a processing indicator, said processing indicator indicating if the forwarded command is completely processed,
executing said command at the command interpreter of the main control unit if the processing indicator indicates that the command is not completely processed,
otherwise returning the command to the command interface.

2. Method according to claim 1, wherein the main control unit comprises the registration unit.

3. Method according to claim 1,
wherein upon forwarding command to secondary control unit, processing the command at the secondary control unit consisting of responding immediately or after predefined time with processing indicator indicating that command is completely processed.

4. Method according to claim 1,
wherein upon reception of the command response from secondary control unit at main control unit,
in case processing indicator of command response indicates that command is not completely processed, and command interpreter of main control unit indicates that the command is not executable by command interpreter,
returning the command response received from secondary control unit to the command interface.

5. Method according to claim 1,
the command interface comprising an external interface and an internal interface, for the main control unit:
communicating with an application control unit communicatively connected to the wireless communication unit by means of the external interface,
and communicating with the secondary control unit by means of the internal interface.

6. Method according to claim 1,
wherein the wireless communication unit comprises at least two secondary control units,
and wherein the received command at the wireless communication unit is received by means of the internal interface from a first secondary control unit,
and after checking received command with registration unit, forwarding received command to a second secondary control unit.

7. Method according to claim 1,
wherein at the secondary control unit upon detection of one of a plurality of events,
sending an asynchronous message indicating detected event to main control unit, at the main control unit forwarding said asynchronous message to the command interface.

8. Method according to claim 1,
wherein upon forwarding command to secondary control unit,
processing the command at the secondary control unit by sending at least one command to the main control unit by means of the internal interface and
receiving response for said sent command from the main control unit.

9. Wireless communication unit comprising a registration unit and a main control unit, the main control unit comprising a command interface, a command interpreter,
the command interpreter being configured to process commands received by means of the command interface and to execute wireless communication tasks with a wireless network,
the main control unit being configured to receive commands by means of the command interface,
the wireless communication unit further comprising an internal operating platform, the internal operating platform comprising at least one secondary control unit, configured to execute commands,
the registration unit is configured to:
 receive from the secondary control unit a registration request for registration of a command,
 store representation relative to the command corresponding to the received registration request,
the main control unit is further configured, upon reception of a command by means of the command interface,
 to check received command with registration unit,
 in case a representation relative to received command being stored in registration unit, forward received command to secondary control unit,
wherein in response to said forwarding of the command, the main control unit is further configured to
 receive from said secondary control unit a command response comprising a processing indicator, said processing indicator indicating if the forwarded command is completely processed,
 execute said command, if the processing indicator indicates that the command is not completely processed,
 otherwise return the command response to the command interface.

10. Wireless communication unit according to claim 9, wherein the main control unit comprises the registration unit.

11. Wireless communication unit according to claim 9, wherein the main control unit is further configured to:
upon reception of the command response from the secondary control unit, in case:
 processing indicator of command response indicates that said command is not completely processed, and
 command interpreter of main control unit indicates that the command is not executable by command interpreter,
return the command response received from secondary control unit to the command interface.

12. Wireless communication unit according to claim 9,
the command interface comprising an external interface and an internal interface,
wherein the main control unit is further configured to communicate with an application control unit communicatively connected to the wireless communication unit by means of the external interface,
and to communicate with the secondary control unit by means of the internal interface.

13. Wireless communication unit according to claim 9,
wherein the wireless communication unit comprises at least two secondary control units, and wherein the received command at the wireless communication unit is received by means of the internal interface from a first secondary control unit,
and the wireless communication unit is further configured to forward the received command to a second secondary control unit after checking the received command with registration unit.

14. Wireless communication unit according to claim 9,
wherein the secondary control unit is configured to:
 upon detection of one of a plurality of events send an asynchronous message indicating detected event to main control unit,
and the main control unit is configured to forward said asynchronous message to the command interface.

15. Wireless communication unit according to claim 9,
wherein the secondary control unit is configured to:
 upon reception of said command process the command by sending at least one command to the main control unit by means of the internal interface and
 receive a response for said sent command from the main control unit.

* * * * *